United States Patent
Lee et al.

(10) Patent No.: US 8,379,171 B2
(45) Date of Patent: Feb. 19, 2013

(54) FRINGE FIELD SWITCHING MODE LIQUID CRYSTAL DISPLAY DEVICE AND METHOD FOR FABRICATING THE SAME

(75) Inventors: Cheol-Hwan Lee, Suwon (KR); Jeong-Hyun Kim, Seoul (KR); Sung-Chol Yi, Goyang (KR); Chang-Gu Lee, Paju (KR); Se-Young Park, Ilsanseo-Gu (KR)

(73) Assignee: LG Display Co., Ltd., Seoul (KR)

( * ) Notice: Subject to any disclaimer, the term of this patent is extended or adjusted under 35 U.S.C. 154(b) by 287 days.

(21) Appl. No.: 12/916,319

(22) Filed: Oct. 29, 2010

(65) Prior Publication Data

US 2011/0102714 A1    May 5, 2011

(30) Foreign Application Priority Data

Oct. 29, 2009   (KR) ................. 10-2009-0103749

(51) Int. Cl.
  *G02F 1/1335*  (2006.01)
(52) U.S. Cl. ...................... 349/106; 349/105
(58) Field of Classification Search ............... 349/105, 349/106; 359/585, 589
  See application file for complete search history.

(56) References Cited

U.S. PATENT DOCUMENTS

| | | | |
|---|---|---|---|
| 5,451,980 A | 9/1995 | Simon et al. | |
| 5,570,139 A | 10/1996 | Wang | |
| 5,973,316 A | 10/1999 | Ebbesen et al. | |
| 5,986,808 A | 11/1999 | Wang | |
| 5,991,000 A | 11/1999 | Shimabukuro et al. | |
| 6,040,936 A | 3/2000 | Kim et al. | |
| 6,097,456 A | 8/2000 | Wang | |
| 6,122,091 A | 9/2000 | Russell et al. | |
| 6,236,033 B1 | 5/2001 | Ebbesen et al. | |
| 6,285,020 B1 | 9/2001 | Kim et al. | |
| 6,441,298 B1 | 8/2002 | Thio | |
| 6,992,826 B2 | 1/2006 | Wang | |
| 7,085,220 B2 | 8/2006 | Fujikata et al. | |
| 7,110,154 B2 | 9/2006 | Ballato et al. | |
| 7,206,114 B2 | 4/2007 | Ballato et al. | |
| 7,248,297 B2 | 7/2007 | Catrysse et al. | |
| 7,417,219 B2 | 8/2008 | Catrysse et al. | |
| 7,420,156 B2 | 9/2008 | Kim et al. | |
| 2006/0284829 A1 | 12/2006 | Moriyama et al. | |
| 2008/0030657 A1* | 2/2008 | Wu et al. ................. | 349/106 |
| 2009/0027329 A1 | 1/2009 | Choi et al. | |
| 2009/0034055 A1 | 2/2009 | Gibson | |
| 2009/0087793 A1 | 4/2009 | Kim et al. | |
| 2009/0091644 A1 | 4/2009 | Mackey | |
| 2009/0322986 A1* | 12/2009 | Wei et al. ................. | 349/64 |
| 2010/0091224 A1* | 4/2010 | Cho et al. ................. | 349/105 |

* cited by examiner

*Primary Examiner* — Michael Caley
(74) *Attorney, Agent, or Firm* — Birch, Stewart, Kolasch & Birch, LLP

(57) ABSTRACT

Discussed are an FFS mode LCD device capable of enhancing a transmittance ratio by including a color filter of a three-dimensional pattern structure having a transmissive pattern for selectively transmitting light of a specific wavelength by using a surface plasmon phenomenon, and a method for fabricating the same. The metal layer using a surface plasmon is utilized as a common electrode of the array substrate, and the pixel electrode having slits is formed on the metal film, thereby generating a fringe field. This may simplify the entire processes, and remove color filter processing lines, thereby reducing the installation costs.

18 Claims, 11 Drawing Sheets

FRINGE FIELD SWITCHING MODE LIQUID CRYSTAL DISPLAY DEVICE AND METHOD FOR FABRICATING THE SAME

CROSS-REFERENCE TO RELATED APPLICATION

Pursuant to 35 U.S.C. §119(a), this application claims the benefit of earlier filing date and right of priority to Korean Application 10-2009-0103749, filed on Oct. 29, 2009, the contents of which are incorporated by reference herein in its entirety.

BACKGROUND OF THE INVENTION

1. Field of the Invention

The present invention relates to a Fringe Field Switching (FFS) mode Liquid Crystal Display (LCD) device and a method for fabricating the same, and particularly, to an FFS mode LCD device including a color filter of a three-dimensional pattern structure having a transmissive pattern for selectively transmitting light of a specific wavelength, and a method for fabricating the same.

2. Discussion of the Related Art

As concerns about an information displays and demands for portable information media are increased, research and commercialization of flat panel displays (FPD) replacing the conventional display apparatus, Cathode Ray Tubes (CRT) are actively ongoing. One of these flat panel displays, a Liquid Crystal Display (LCD) device serves to display an image by using optical anisotropy of a liquid crystal (LC). Owing to an excellent resolution, color reproduction characteristic, and picture quality, the LCD device is being actively applied to a notebook, a desk top monitor, etc.

The LCD device is largely comprised of a color filter substrate, an array substrate, and an LC layer interposed between the color filter substrate and the array substrate.

The LCD device is fabricated through a plural number of mask processes (i.e., photo lithography process). Accordingly, a method for reducing the number of mask processes is required for enhanced productivity.

Hereinafter, a structure of the related art LCD device will be explained in more detail with reference to FIG. 1.

FIG. 1 is a disassembled perspective view schematically showing a structure of the related art LCD.

As shown in FIG. 1, the LCD device largely comprises a color filter substrate 5, an array substrate 10, and an LC layer 30 interposed between the color filter substrate 5 and the array substrate 10.

The color filter substrate 5 consists of a color filter (C) composed of a plurality of sub color filters 7 for implementing red, green and blue (RGB) colors, a black matrix 6 for dividing the sub color filters 7 from each other and shielding light passing through the LC layer 30, and a transparent common electrode 8 for applying a voltage to the LC layer 30.

The array substrate 10 consists of a plurality of gate lines 16 and data lines 17 arranged in horizontal and vertical directions to define a plurality of pixel regions (P), Thin Film Transistors (TFT), switching devices formed at each intersection between the gate lines 16 and the data lines 17, and pixel electrodes 18 formed in the pixel regions (P).

The color filter substrate 5 and the array substrate 10 facing each other are bonded to each other by a sealant (not shown) formed on an outer periphery of an image display region, thereby constituting an LC panel. The color filter substrate 5 and the array substrate 10 are bonded to each other by alignment keys (not shown) formed at the color filter substrate 5 or the array substrate 10.

In order to prevent light leakage due to an alignment error when bonding the two substrates to each other, a line width of the black matrix is set to be wide, thereby obtaining an alignment margin. This may reduce an aperture ratio of the LC panel.

The general color filter used in the LCD device implements colors by absorbing light of unnecessary colors for disappearance with using pigments or dyes, and by selectively transmitting light of desired colors. This may allow only one of RGB colors, from white incident light, to be transmitted to one sub-pixel. Accordingly, it is difficult to have a transmittance ratio more than 30%. Due to this low transmittance ratio of the LC panel, power consumption by a backlight is increased.

FIG. 2 is an exemplary view schematically showing a transmittance ratio of the LC panel when applying a color filter using a general pigment dispersing method.

Referring to FIG. 2, as light incident from a backlight has a decreased optical amount decreased while sequentially passing through a polarizer, a TFT array, an LC and a color filter, a transmittance ratio is reduced to 5% or less than.

Here, the polarizer, the TFT array and the color filter approximately have transmittance ratios of ~40%, 45~55% and ~25%, respectively.

The general color filter is fabricated with complicated processes since it repeatedly undergoes color resist coating, exposure to light, development and hardening processes according to each color.

Furthermore, in order to fabricate the color filter, the common electrode and the black matrix on the color filter substrate, color filter processing lines have to be implemented separately from TFT processing lines. This may increase line installation costs.

SUMMARY OF THE INVENTION

Therefore, an object of the present invention is to provide a Fringe Field Switching (FFS) mode Liquid Crystal Display (LCD) device capable of enhancing an aperture ratio and a transmittance ratio of an LC panel, by forming a color filter having an enhanced transmittance ratio by using a surface plasmon phenomenon, without using the general dyes or pigments, and a method for fabricating the same.

Another object of the present invention is to provide an FFS mode LCD device capable of implementing a wide viewing angle by generating a fringe field, by removing color filter processing lines by utilizing a surface plasmon metal layer as a common electrode of an array substrate, and by forming a pixel electrode having slits on the surface plasmon metal layer, and a method for fabricating the same.

To achieve these and other advantages and in accordance with the purpose of the present invention, as embodied and broadly described herein, there is provided a Fringe Field Switching (FFS) mode Liquid Crystal Display (LCD) device, comprising: a first substrate; a color filter formed on the first substrate and serving as a common electrode as a common voltage is applied to a metal layer, for implementing colors as a sub-wavelength transmissive pattern having a predetermined period is formed at the metal layer; a gate electrode and a gate line formed on the first substrate having the color filter formed thereon; a first insulating layer formed on the first substrate having the gate electrode and the gate line formed thereon; an active pattern formed on the first substrate having the first insulating layer formed thereon; source/drain electrodes formed on the first substrate having the active pattern formed thereon, and a data line crossing the gate line to define a pixel region; a second insulating layer formed on the first substrate having the source/drain electrodes and the data line formed thereon; a pixel electrode formed on the first substrate having the second insulating layer formed thereon, for generating a fringe field together with the metal layer of the color filter; and a second substrate bonded to the first substrate with facing each other, and having no color filter, black matrix and common electrode formed thereon.

To achieve these and other advantages and in accordance with the purpose of the present invention, as embodied and broadly described herein, there is also provided a method for fabricating a Fringe Field Switching (FFS) mode Liquid Crystal Display (LCD) device, the method comprising: providing a first substrate and a second substrate; forming a color filter on the first substrate, the color filter serving as a common electrode as a common voltage is applied to a metal layer, and implementing colors as a sub-wavelength transmissive pattern having a predetermined period is formed at the metal layer; forming a gate line and a gate electrode on the first substrate having the color filter formed thereon; forming a first insulating layer on the first substrate having the gate electrode and the gate line formed thereon; forming an active pattern on the first substrate having the first insulating layer formed thereon; forming source/drain electrodes on the first substrate having the active pattern formed thereon, and forming a data line crossing the gate line to define a pixel region; forming a second insulating layer formed on the first substrate having the source/drain electrodes and the data line formed thereon; forming a pixel electrode on the first substrate having the second insulating layer formed thereon, the pixel electrode for generating a fringe field together with the metal layer of the color filter; and bonding the first and second substrates to each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, a Fringe Field Switching (FFS) mode Liquid Crystal Display (LCD) device and a method for fabricating the same according to the present invention will be explained in more detail with reference to the attached drawings.

The general method for enhancing a transmittance ratio of an LC panel by improving an aperture ratio of an array substrate has many limitations. Accordingly, the general paradigm has to be changed into a new paradigm for enhancing a transmittance ratio of an LC panel by removing a color filter.

For this, has been proposed a method for filtering light by forming a transmissive pattern at a metal layer so that light of a specific wavelength can be selectively transmitted. The present invention is to provide a color filter capable of transmitting RGB light by forming a metal layer color filter using a surface plasmon.

Figure 1:
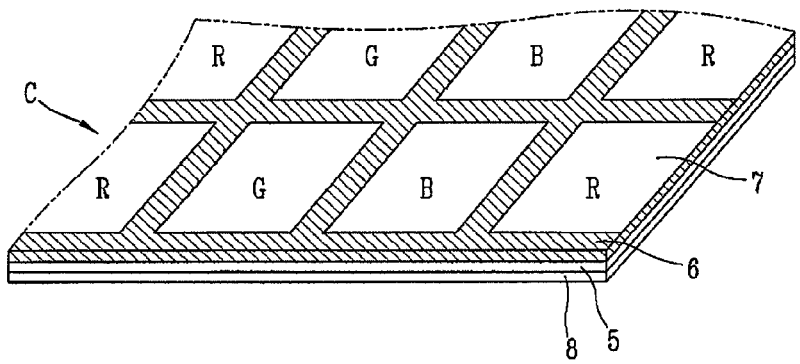
FIG. 1 is a disassembled perspective view schematically showing a structure of a liquid crystal display (LCD) device in accordance with the related art.
Figure 1:
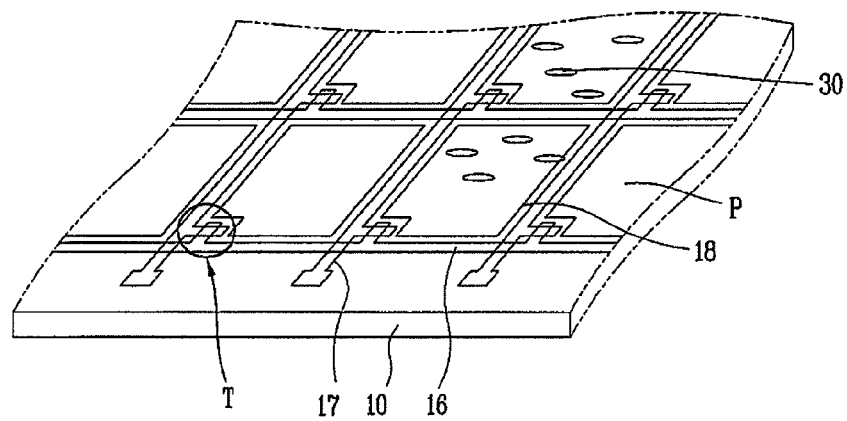
Figure 2:
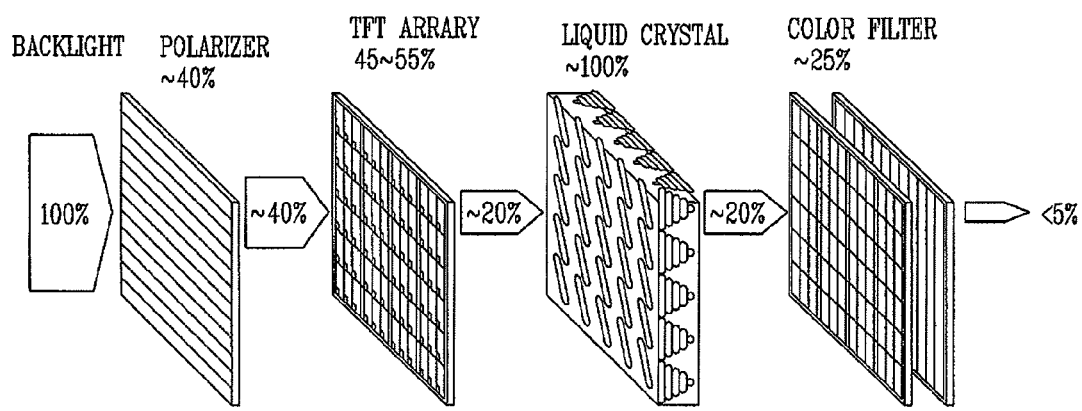
FIG. 2 is an exemplary view schematically showing a transmittance ratio of an LC panel when applying a color filter using a general pigment dispersing method.
Figure 3A:
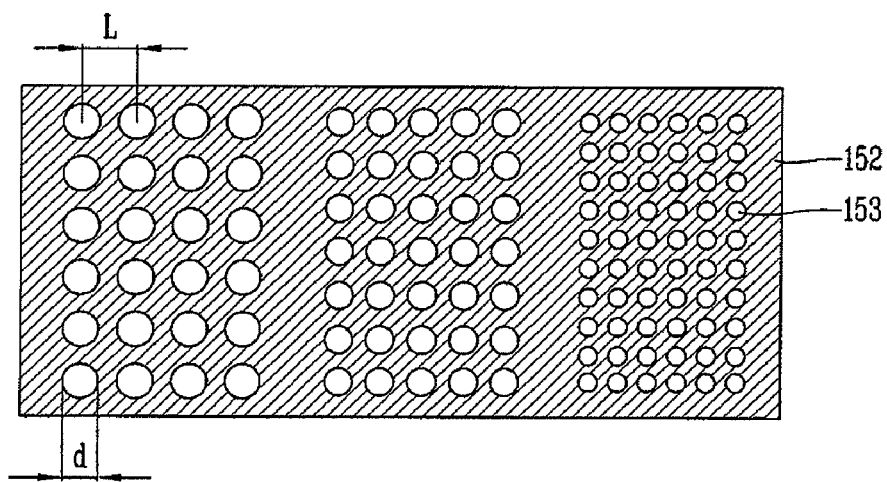
FIGS. 3A and 3B are respectively planar and sectional views schematically showing a structure of a color filter fabricated by using a surface plasmon phenomenon according to the present invention.
Figure 3B:
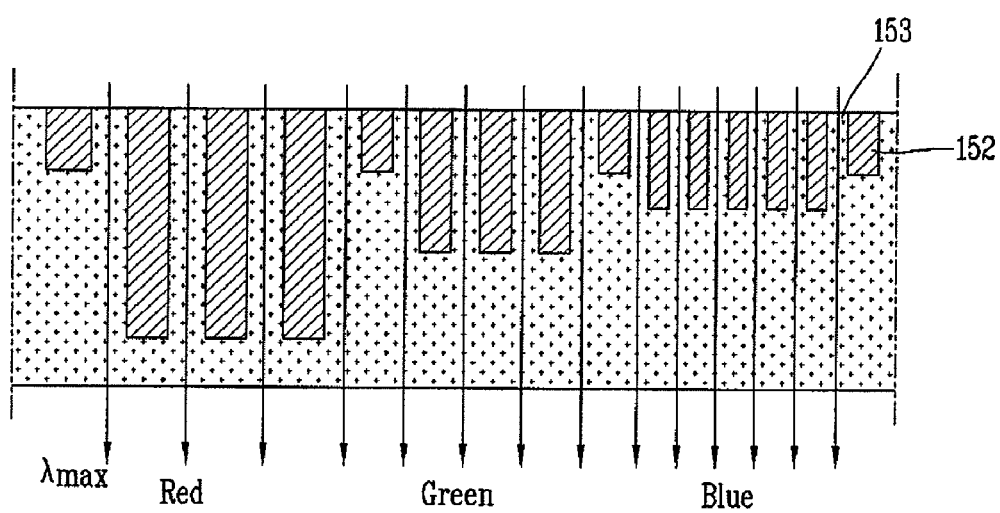

FIGS. 3A and 3B are respectively planar and sectional views schematically showing a structure of a color filter fabricated by using a surface plasmon phenomenon according to the present invention.

Referring to FIG. 3, a sub-wavelength transmissive pattern 153 having a predetermined period (L) is formed on a metal layer 152. An electric field of incident light having both a wavelength of a visible light and a wavelength of a near infrared light is coupled to a plasmon. Accordingly, only light of a specific wavelength is transmitted, and light of other wavelengths is reflected, thereby obtaining RGB colors.

For instance, if a sub-wavelength hole pattern having a constant period (L) is formed on a silver film, selected RGB light of a specific wavelength is transmitted according to a size (d) and a period (L) of a hole, thereby implementing RGB colors. A greater amount of light than a hole area may be transmitted by absorbing light near the hole.

In order to implement a color of a high purity, each thickness of the metal layer 152 corresponding to each wavelength may be differently controlled. However, the present invention is not limited to this.

For your reference, the plasmon refers to a quasiparticle that free electrons induced on a surface of metal oscillate collectively by an electric field of incident light. A surface plasmon indicates that the plasmon partially exists on the metal surface, which corresponds to an electromagnetic wave that proceeds along an interface between the metal and a dielectric.

The surface plasmon phenomenon refers to forming light of a specific wavelength as light of a specific wavelength incident onto a surface of metal having a nano-sized periodic hole pattern resonates with free electrons on the metal surface. Only light of a specific wavelength is made to transmit through the hole, and light of other wavelengths is made to be reflected from the metal surface.

Multi-colors may be extracted from white light by selectively transmitting desired light by controlling a period of a transmissive pattern. Here, the transmitted light has a wavelength corresponding to about 1.7~2 times of a period of the transmissive pattern. Accordingly, it is possible to transmit light of a desired wavelength by controlling the period of the transmissive pattern.

The transmissive pattern may have not only a circular shape such as a hole, but also various shapes such as an oval shape, a quadrangular shape, a triangular shape, and a slit shape. The hole may have a diameter of 100~300 nm, and a period of 300~700 nm. In order to transmit blue light of a wavelength of 436 nm, the hole has a period of 300 nm and a size of 155 nm. In order to transmit green light of a wavelength of 538 nm, the hole has a period of 450 nm and a size of 180 nm. And, in order to transmit red light of a wavelength of 627 nm, the hole has a period of 550 nm and a size of 225 nm.

The hole pattern having a specific period and size is formed on the metal layer, and the metal layer having the hole pattern is used as a color filter using a surface plasmon occurring from the metal layer. The color filter is applied to an LCD device, thereby implementing colors.

The general color filter is formed on an upper substrate, a color filter substrate. However, the color filter using a surface plasmon according to the present invention may be formed on a lower substrate, an array substrate.

More concretely, the general color filter using pigments or dyes can not undergo a high temperature process. On the other hand, the color filter using a surface plasmon according to the present invention can undergo a high temperature process above the metal layer. This may allow a thin film transistor to be fabricated through the high temperature process. Furthermore, since the color filter is formed at the lower array substrate, can be solved the general problem, decrease of an aperture ratio occurring as an alignment margin is obtained when bonding the upper and lower substrates to each other.

Especially, in the present invention, the color filter is formed on the array substrate having a TFT, and the metal layer color filter is utilized as a common electrode. This may simplify the entire processes, and allow the upper color filter to be removed.

Figure 4:
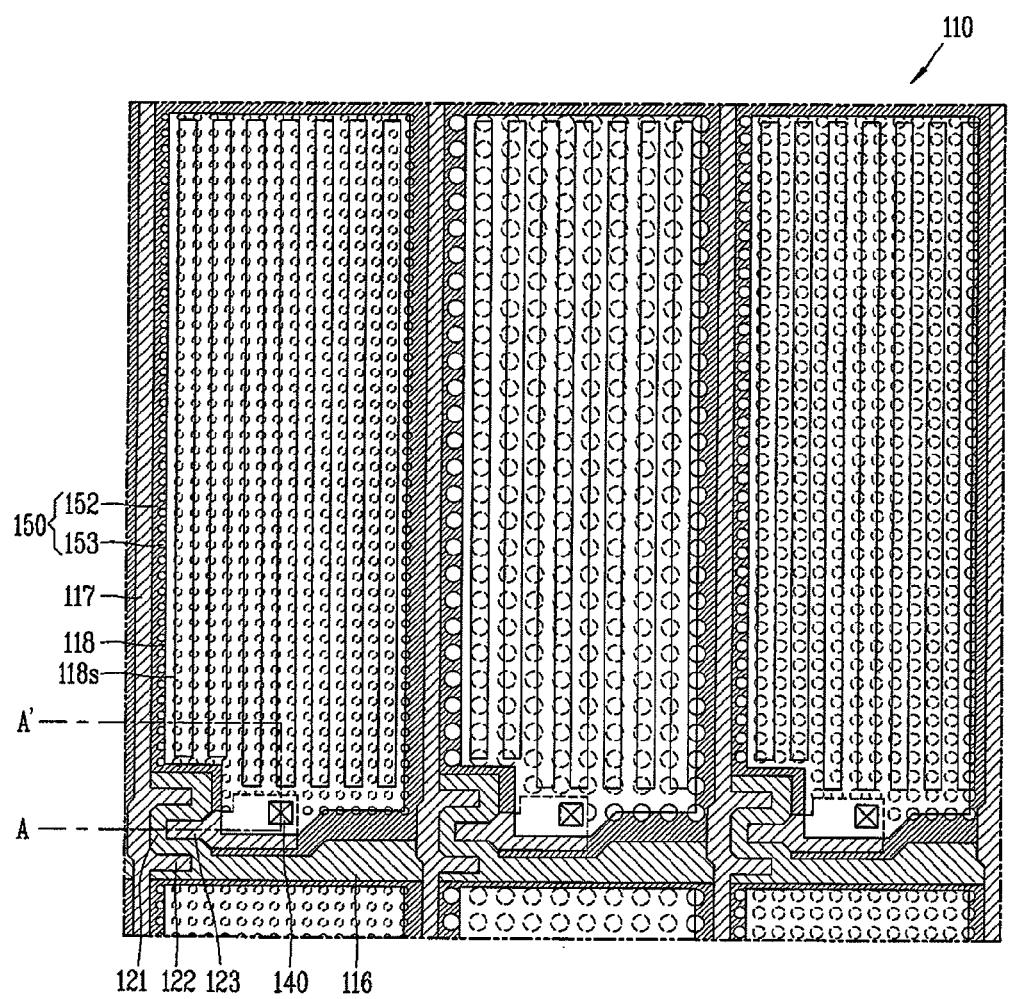
FIG. 4 is a planar view schematically showing a part of an array substrate of a Fringe Field Switching (FFS) mode Liquid Crystal Display (LCD) device according to the present invention.

FIG. 4 is a planar view schematically showing a part of an array substrate of a Fringe Field Switching (FFS) mode Liquid Crystal Display (LCD) device according to the present invention.

For convenience, FIG. 4 shows one pixel composed of sub-color filters corresponding to blue, red and green from the left side. However, the present invention is not limited to this, but may be applicable to sub-color filters corresponding to multi-colors more than three colors.

The sub-pixels corresponding to the blue, red and green are composed of the same elements except for a structure of the color filter, i.e., the size and period of the transmissive pattern.

In the preferred embodiment, a fringe field generated between a pixel electrode and a common electrode passes through slits to drive liquid crystal molecules, thereby implementing an image.

As shown in FIG. 4, on an array substrate 110, a gate line 116 and a data line 117 for defining a pixel region are formed in horizontal and vertical directions. A thin film transistor (TFT), a switching device is formed at an intersection between the gate line 116 and the data line 117. In the pixel region, formed are a pixel electrode 118 having a plurality of slits 118s and configured to drive a liquid crystal (not shown) by generating a fringe field, and a surface plasmon metal layer 152 formed on the entire array substrate 110 in a box shape and serving as a common electrode.

The surface plasmon metal layer 152 is formed on an entire pixel unit of a lowest layer of the array substrate 110 in a box shape, thereby being utilized as a common electrode, a counter electrode of the pixel electrode 118. The sub-wavelength transmissive pattern 153 having a constant period is formed in the pixel region. An electric field of incident light having both a wavelength of a visible light and a wavelength of a near infrared light is coupled to a plasmon. As a result, only light of blue, red and green wavelengths is transmitted, and light of other wavelengths is reflected. Accordingly, the color filter 150 for implementing RGB colors is formed.

As aforementioned, in order to transmit blue light of a wavelength of 436 nm, the transmissive pattern 153, e.g., the hole period and the hole size are set as about 300 nm and 155 nm, respectively. In order to transmit green light of a wavelength of 538 nm, the hole period and the hole size are set as about 450 nm and 180 nm, respectively. And, in order to transmit red light of a wavelength of 627 nm, the hole period and the hole size are set as about 550 nm and 225 nm, respectively.

The TFT consists of a gate electrode 121 constituting a part of the gate line 116, a source electrode 122 connected to the data line 117, and a drain electrode 123 connected to the pixel electrode 118. The TFT further includes a first insulating layer (not shown) for insulating the gate electrode 121 and the source/drain electrodes 122 and 123 from each other, and an active pattern (not shown) for forming a conductive channel between the source electrode 122 and the drain electrode 123 by a gate voltage applied to the gate electrode 121.

In the drawing, the source electrode 122 has a 'U' shape, and the TFT has a 'U'-shaped channel. However, the present invention is not limited to this, but may be applicable regardless of a channel type of the TFT.

A part of the source electrode 122 is extending to one direction, thereby constituting a part of the data line 117. And, a part of the drain electrode 123 is extending to the pixel region, thereby being electrically connected to the pixel electrode 118 through a contact hole 140 of a second insulating layer (not shown).

As aforementioned, in the pixel region, formed are the surface plasmon metal layer 152 for generating a fringe field, and the pixel electrode 118. The pixel electrode 118 is formed to have a plurality of slits 118s in the pixel region where the transmissive pattern 153 of the color filter 150 has been formed. And, the surface plasmon metal layer 152 is formed on the entire pixel unit in a single pattern, and serves as a common electrode.

In the drawing, the slits 118s of the pixel electrode 118 are formed in the same direction as the gate line 116. However, the present invention is not limited to this. That is, the slits 118s of the pixel electrode 118 may be also formed in the same direction as the data line 117.

Figure 5:
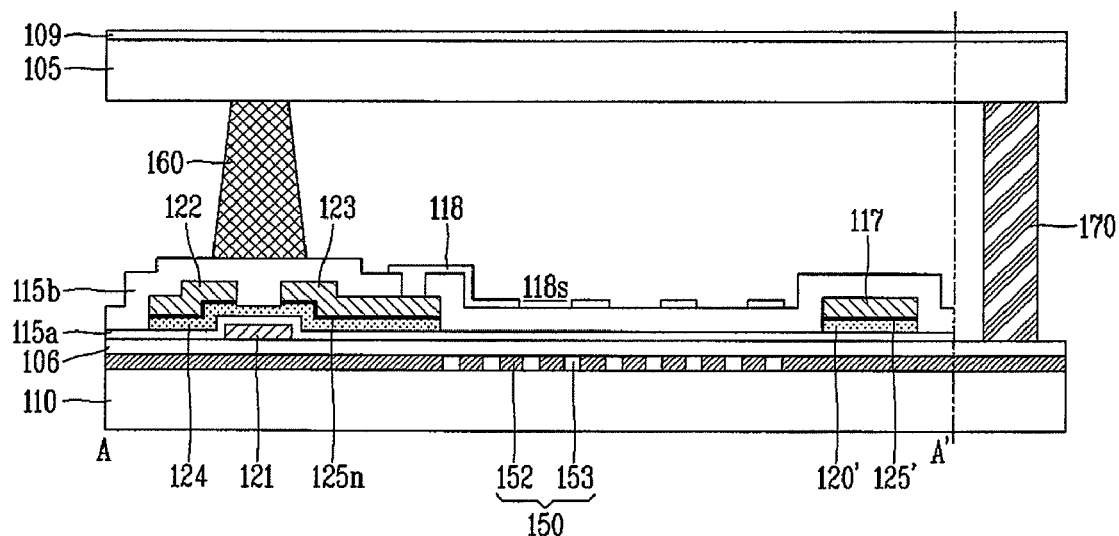
FIG. 5 is a sectional view schematically showing a structure of the FFS mode LCD device according to the present invention.

As shown in FIG. 5, the array substrate 110 and the color filter substrate 105 are bonded to each other with facing each other, by a sealant 170 formed on an outer periphery of an image display region, in a state that a constant cell gap is maintained therebetween by a column spacer 160. On the color filter substrate 105, may be formed other components rather than a color filter, a black matrix and a common electrode, i.e., an ITO back electrode 109 for preventing static electricity. The metal layer 152 of the color filter 150 formed on the array substrate 110 receives a common voltage from a driving circuit portion (not shown).

The sealant 170 is disposed between the upper color filter substrate 105 and the color filter 150 of the lower array substrate 110. When an insulating layer 106 is formed on the color filter 150, the sealant 170 is disposed between the upper color filter substrate 105 and the insulating layer 106 of the lower array substrate 110.

In the case of forming the color filter 150 on the array substrate 110, a margin for aligning the upper color filter substrate 105 and the lower array substrate 110 with each other is not required. This may allow an aperture ratio to be additionally obtained when designing an LC panel, thereby enhancing a transmittance ratio of the LC panel. As the transmittance ratio of the LC panel is enhanced, a brightness of a backlight can be reduced. This may reduce power consumption by the backlight.

As the power consumption by the backlight is reduced, multi color pixels can be implemented to obtain a high picture quality with real color reproduction.

In the case of forming the color filter 150 on the array substrate 110, and removing color filter processing lines by utilizing the metal layer 152 of the color filter 150 as a common electrode, the installation costs may be reduced by about 50%.

FIGS. 6A to 6E are planar views sequentially showing processes for manufacturing the array substrate of FIG. 4, and FIGS. 7A to 7G are sectional views sequentially showing processes for manufacturing the FFS mode LCD device of FIG. 5.

Figure 6A:
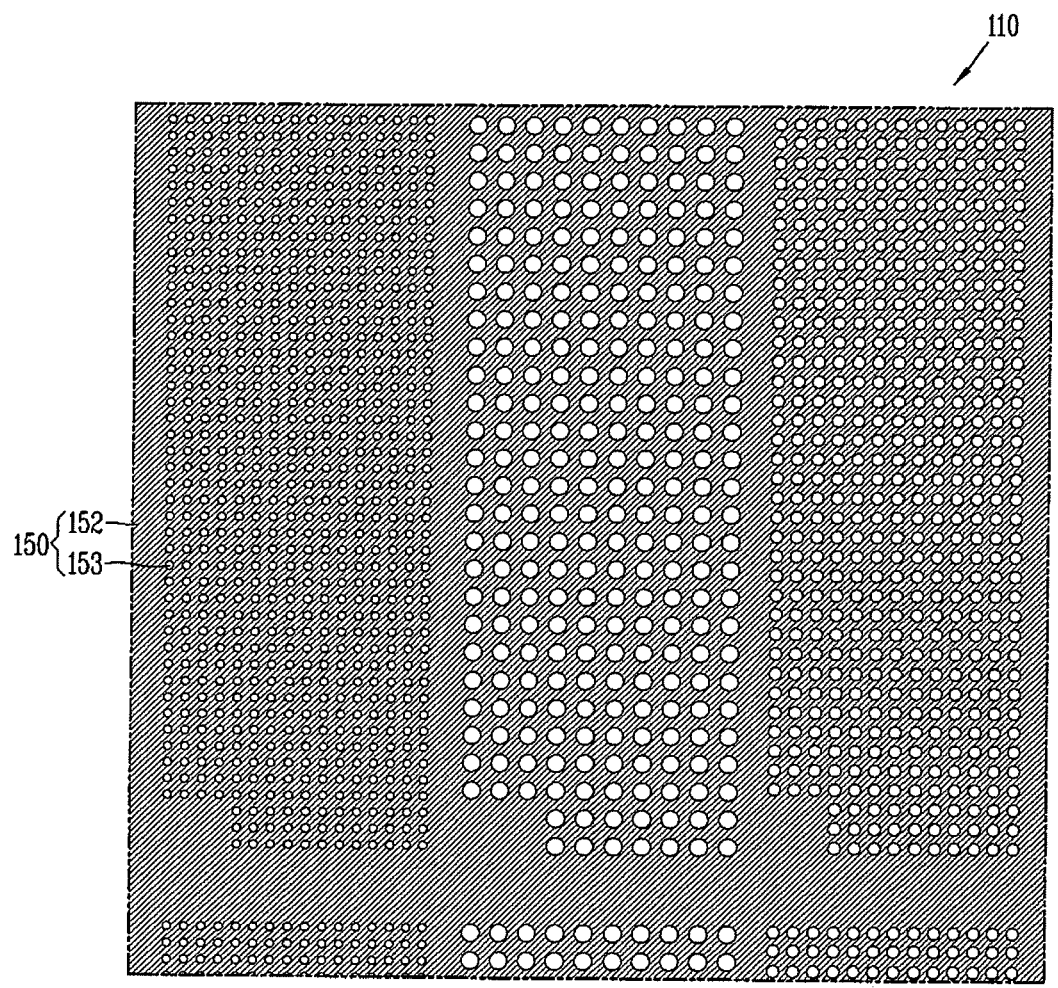
FIGS. 6A to 6E are planar views sequentially showing processes for manufacturing the array substrate of FIG. 4.
Figure 7A:
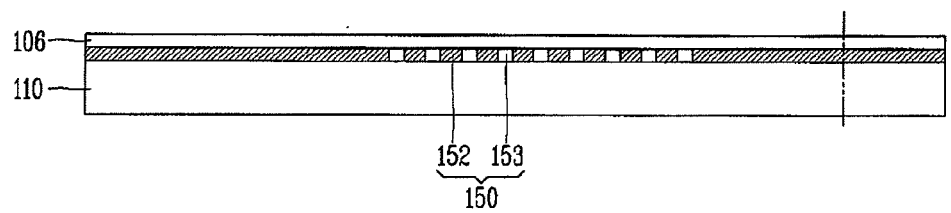
FIGS. 7A to 7G are sectional views sequentially showing processes for manufacturing the FFS mode LCD device of FIG. 5.

As shown in FIGS. 6A and 7A, the color filter 150 using a surface plasmon is formed on the array substrate 110 formed of a transparent insulating material such as glass.

The color filter 150 implements RGB colors as the sub-wavelength transmissive pattern 153 having a constant period is formed at the metal layer 152. As the transmissive pattern 153, may be selectively used a transparent polymer having a high transmittance ratio and an excellent optical characteristic, Spin On Glass (SOG), organic or inorganic materials, etc. The metal layer 152 may be formed of aluminum, molybdenum, copper, gold, silver, chrome, etc.

The transmissive pattern 153 of the color filter 150 is formed by using a polymer film transition patterning method using soft molding, capillary force lithography, and rigiflex mold, by using a patterning method using UV curing polymer, etc. Then, the metal layer 152 is formed in the transmissive pattern 153 by performing processes such as depositing a metal layer and planarizing an insulating layer. However, the method for forming the color filter 150 according to the present invention is not limited to this.

The color filter 150 according to the present invention implements RGB colors by selectively transmitting a red color through a red color transmissive pattern inside a red color region, by selectively transmitting a green color through a green color transmissive pattern inside a green color region, and by selectively transmitting a blue color through a blue color transmissive pattern inside a blue color region.

In the color filter 150, the transmissive patterns corresponding to red, green and blue sub-pixels are differently set, i.e., the hole sizes and thicknesses of the metal layer are differently set in order to enhance a transmittance ratio. More concretely, a red color transmissive pattern having a relatively thickest thickness is formed in a red color region, a green color transmissive pattern having a thickness thinner than that of the red color transmissive pattern is formed in a green color region, and a blue color transmissive pattern having a relatively thinnest thickness is formed in a blue color region. However, the present invention is not limited to this.

For a high transmittance ratio, it is advantageous to entirely cover the metal layer 152 of the color filter 150 using a surface plasmon with the same insulating layer. In the case of forming the color filter 150 on the glass substrate, an insulating layer such as $SiO_2$ having the same dielectric constant as that of the glass substrate is preferably formed on the color filter 150.

Figure 6B:
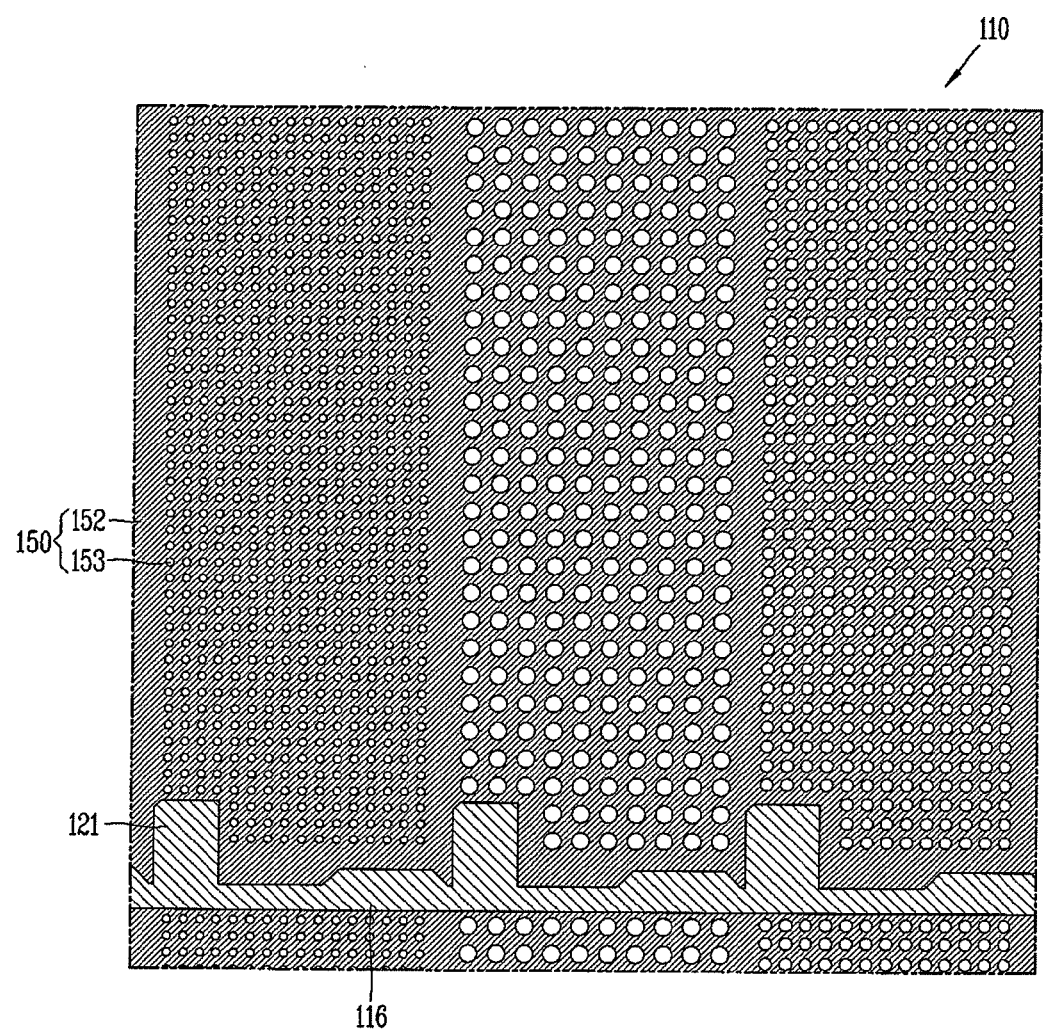
Figure 7B:
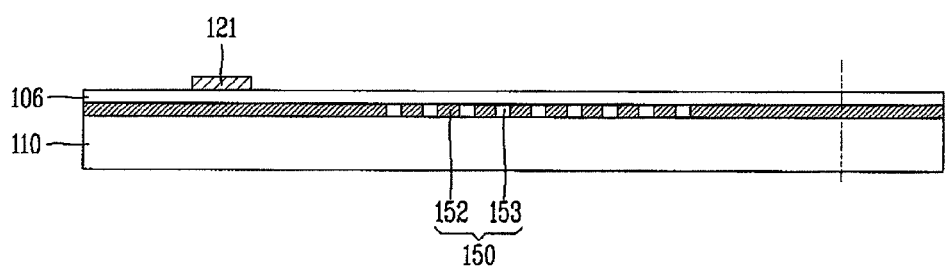

As shown in FIGS. 6B and 7B, the gate electrode 121 and the gate line 116 are formed on the array substrate 110 where the insulating layer 106 has been formed.

Here, the gate electrode 121 and the gate line 116 are formed by depositing a first conductive film on the entire surface of the array substrate 110, and then by selectively pattering the first conductive film by a photolithography process.

The first conductive film may be formed of an opaque conductive material having a low resistance, such as aluminum (Al), Al alloy, tungsten (W), copper (Cu), chromium (Cr), molybdenum (Mo), and Mo alloy. Alternatively, the first conductive film may be formed to have a multi-structure implemented as at least two of the above materials are laminated on each other.

Figure 6C:
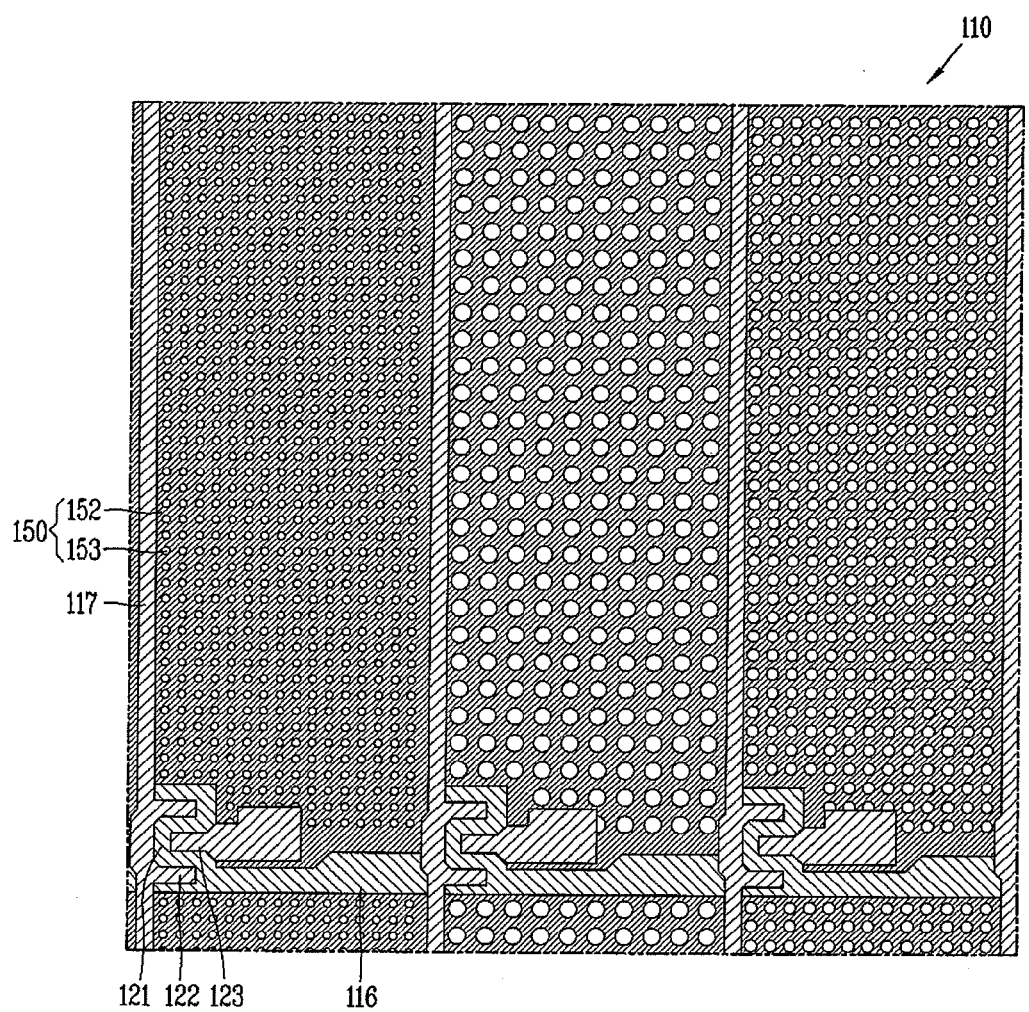
Figure 7C:
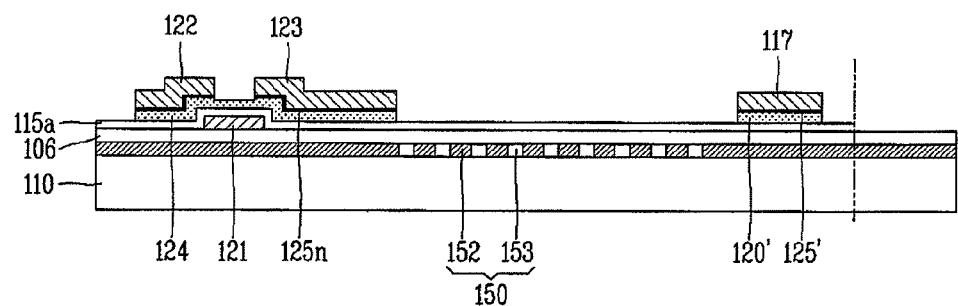

As shown in FIGS. 6C and 7C, on the entire surface of the array substrate 110 having the gate electrode 121 and the gate line 116 formed thereon, a first insulating layer 115a, an amorphous silicon thin film, an n+ amorphous silicon thin film, and a second conductive film are deposited, and then are selectively removed by a photolithography process. As a result, on the array substrate 110, formed are an active pattern 124 formed of the amorphous silicon thin film, and source/drain electrodes 122 and 123 formed of the second conductive film and electrically connected to source/drain regions of the active pattern 124.

The data line 117 formed of the second conductive film and crossing the gate line 116 to define a pixel region is formed through the photolithography process.

An ohmic contact layer 125n formed of the n+ amorphous silicon thin film and patterned in the same shape as the source/drain electrodes 122 and 123 is formed above the active pattern 124.

An amorphous silicon thin film pattern 120' and an n+ amorphous silicon thin film pattern 125', each formed of the amorphous silicon thin film and the n+ amorphous silicon thin film, respectively, and each patterned in the same shape as the data line 117 are formed below the data line 117.

The active pattern 124, the source/drain electrodes 122 and 123, and the data line 117 may be simultaneously formed by a single mask process using a half-tone mask or a diffraction mask.

The second conductive film may be formed of an opaque conductive material having a low resistance, such as aluminum (Al), Al alloy, tungsten (W), copper (Cu), chromium (Cr), molybdenum (Mo), and Mo alloy, so as to constitute the source/drain electrodes 122 and 123 and the data line 117. Alternatively, the second conductive film may be formed to have a multi-structure implemented as at least two of the above materials are laminated on each other.

Figure 6D:
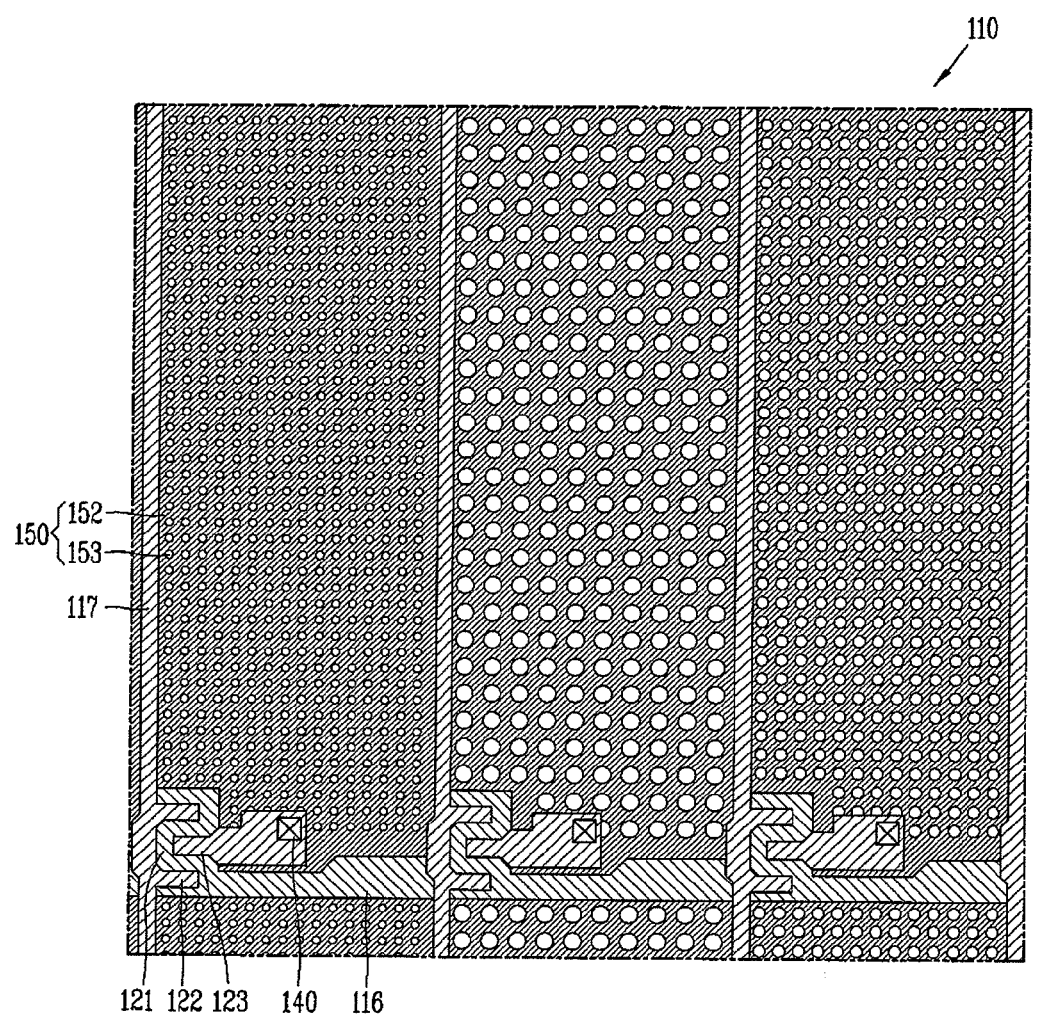
Figure 7D:
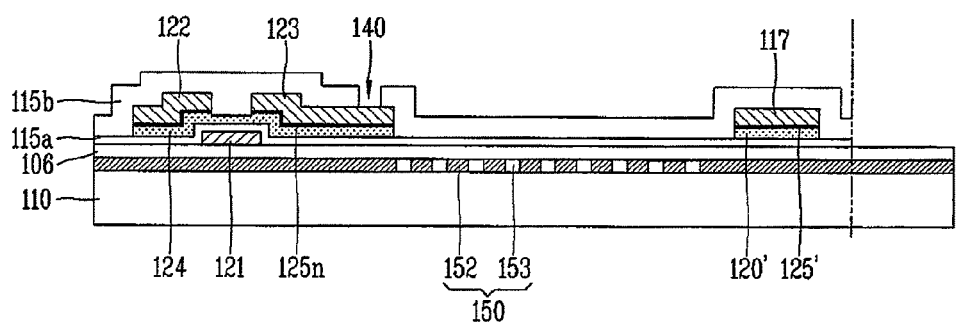

As shown in FIGS. 6D and 7D, a second insulating layer 115b is formed on the entire surface of the array substrate 110 having the active pattern 124, the source/drain electrodes 122 and 123, and the data line 117 formed thereon. Then, the second insulating layer 115b is selectively removed by a photolithography process, thereby forming, on the array substrate, a contact hole 140 exposing a part of the drain electrode 123.

The second insulating layer 115b may be formed of an inorganic insulating layer such as silicon nitride or silicon oxide, or may be formed of an organic insulating layer such as photoacryl or benzocyclobutene (BCB).

Figure 6E:
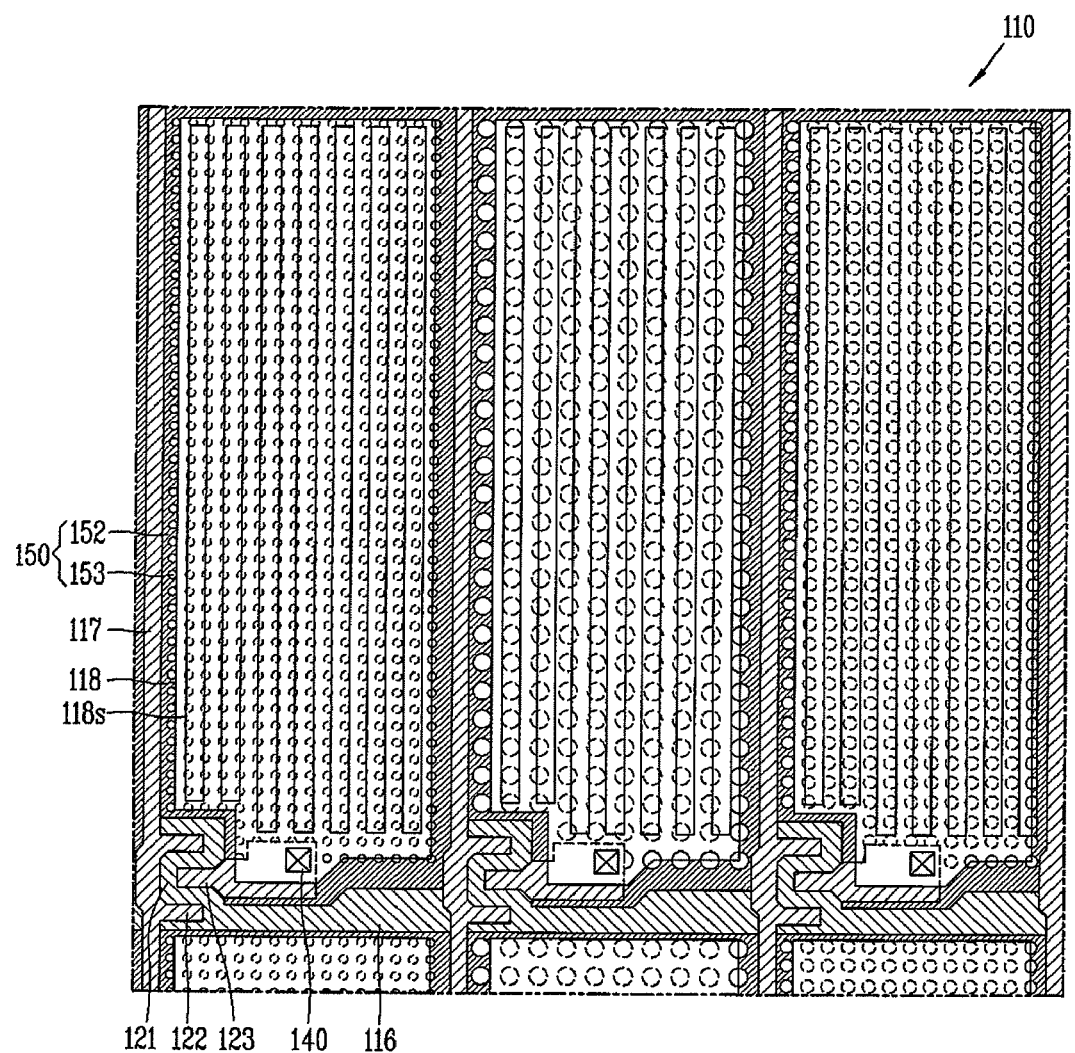
Figure 7E:
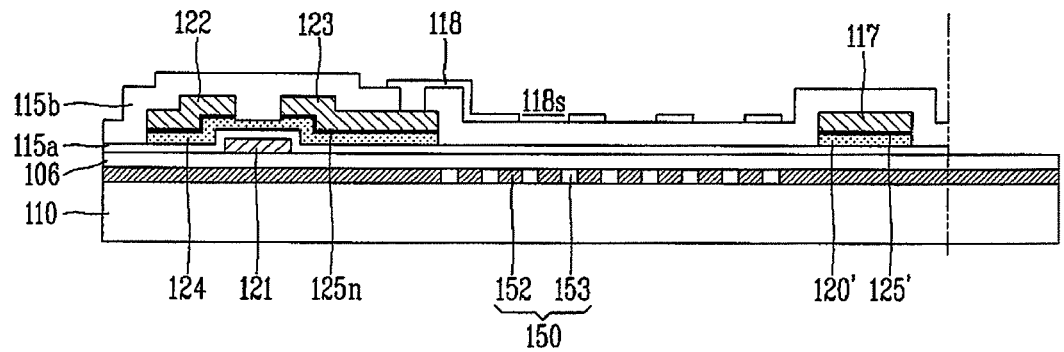

As shown in FIGS. 6E and 7E, a third conductive film is formed on the entire surface of the array substrate 110 having the second insulating layer 115b formed thereon, and then is selectively removed by a photolithography process. As a result, formed is a pixel electrode 118 electrically connected to the drain electrode 123 through the contact hole 140.

Here, the third conductive film includes a transparent conductive material having a high transmittance ratio, such as Indium Tin Oxide (ITO) or Indium Zinc Oxide (IZO) so as to constitute the pixel electrode.

As aforementioned, the metal layer 152 of the color filter 150 serves as a common electrode by being formed in a single pattern on the entire pixel unit. In the pixel region, the pixel electrode 118 having the plurality of slits 118s is formed to generate a fringe field together with the metal layer 152 of the color filter 150.

The metal layer 152 of the color filter 150 is formed in a single pattern on the entire pixel unit, thereby being formed below the gate line 116, the data line 117, and the TFT where the plurality of slits 118s have not been formed. For your reference, the pixel unit indicates an image display region of the array substrate 110 for displaying an image by a plurality of pixel regions.

Figure 7F:
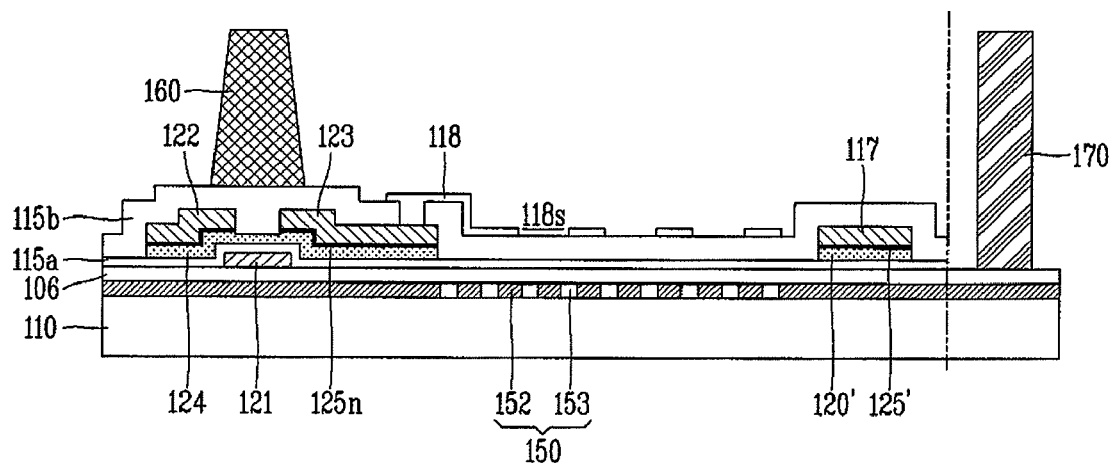
Figure 7G:
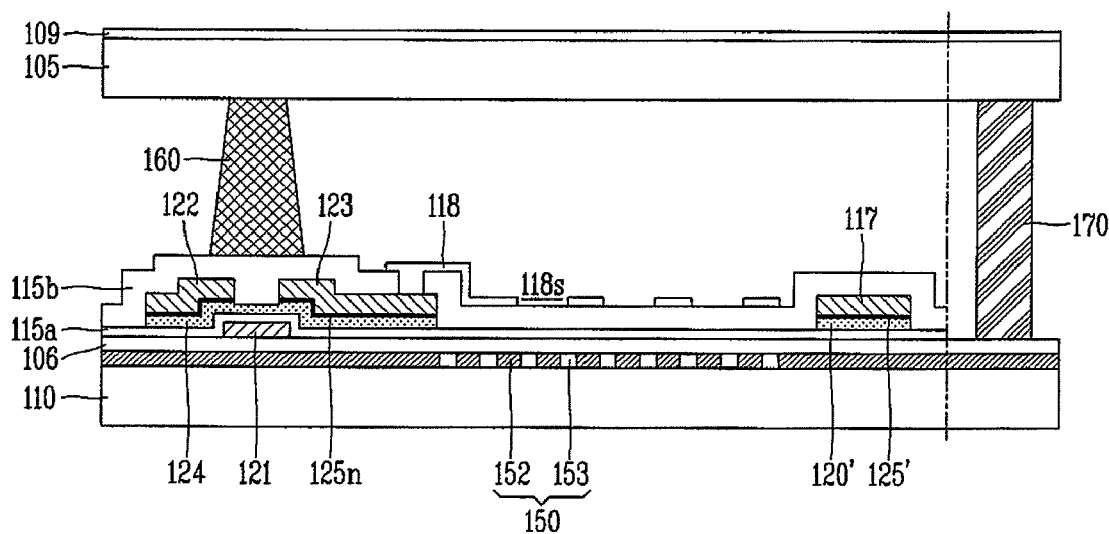

As shown in FIGS. 7F and 7G, the array substrate 110 and the color filter substrate 105 are bonded to each other with facing each other, by a sealant (not shown) formed on an outer periphery of the image display region, in a state that a constant cell gap is maintained therebetween by the column spacer 160.

In the preferred embodiment, the column spacer 160 and the sealant 170 are formed on the lower array substrate 110 so as to reduce color filter processes. However, the present invention is not limited to this.

In the preferred embodiment, it was explained that the present invention was applied to an amorphous silicon thin film transistor using an amorphous silicon thin film as an active pattern. However, the present invention is not limited to this. That is, the present invention may be also applied to a polycrystalline silicon thin film transistor using a polycrystalline silicon thin film as an active pattern.

The present invention may be applied not only to an LCD device, but also to other display devices fabricated by using thin film transistors, e.g., an OLED display device in which Organic Light Emitting Diodes (OLED) are connected to driving transistors.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for fabricating a Fringe Field Switching (FFS) mode Liquid Crystal Display (LCD) device, the method comprising:
providing a first substrate and a second substrate;
forming a color filter on the first substrate, the color filter serving as a common electrode as a common voltage is applied to a metal layer, and implementing colors as a sub-wavelength transmissive pattern having a predetermined period is formed at the metal layer;
forming a gate line and a gate electrode on the first substrate having the color filter formed thereon;
forming a first insulating layer on the first substrate having the gate electrode and the gate line formed thereon;
forming an active pattern on the first substrate having the first insulating layer formed thereon;
forming source/drain electrodes on the first substrate having the active pattern formed thereon, and forming a data line crossing the gate line to define a pixel region;
forming a second insulating layer formed on the first substrate having the source/drain electrodes and the data line formed thereon;
forming a pixel electrode on the first substrate having the second insulating layer formed thereon, the pixel electrode for generating a fringe field together with the metal layer of the color filter; and
bonding the first and second substrates to each other.

2. The method of claim 1, further comprising forming, on the color filter, an insulating layer formed of a material of the first substrate.

3. The method of claim 1, further comprising forming a back electrode on the second substrate.

4. The method of claim 1, wherein the color filter is formed in a three-dimensional pattern structure having transmissive patterns of different sizes, the transmissive patterns for selectively transmitting light of red, green, and blue wavelengths.

5. The method of claim 1, wherein the metal layer is formed of one of aluminum, molybdenum, copper, gold, silver, and chrome.

6. The method of claim 1, wherein the transmissive pattern is formed of one of transparent polymer, Spin On Glass (SOG), organic material, and inorganic material.

7. The method of claim 1, wherein the transmissive pattern has one of a circular shape, a hole shape, an oval shape, a quadrangular shape, a triangular shape, and a slit shape.

8. The method of claim 1, wherein the pixel electrode has a plurality of slits in the pixel region.

9. The method of claim 1, wherein the metal layer of the color filter is formed in a single pattern on an entire pixel unit for displaying an image by a plurality of pixel regions.

10. A Fringe Field Switching (FFS) mode Liquid Crystal Display (LCD) device, comprising:
a first substrate;
a color filter formed on the first substrate and serving as a common electrode as a common voltage is applied to a metal layer, for implementing colors as a sub-wavelength transmissive pattern having a predetermined period is formed at the metal layer;
a gate electrode and a gate line formed on the first substrate having the color filter formed thereon;
a first insulating layer formed on the first substrate having the gate electrode and the gate line formed thereon;
an active pattern formed on the first substrate having the first insulating layer formed thereon;
source/drain electrodes formed on the first substrate having the active pattern formed thereon, and a data line crossing the gate line to define a pixel region;
a second insulating layer formed on the first substrate having the source/drain electrodes and the data line formed thereon;

a pixel electrode formed on the first substrate having the second insulating layer formed thereon, for generating a fringe field together with the metal layer of the color filter; and a second substrate bonded to the first substrate with facing each other, and having thereon no color filter, black matrix and common electrode.

11. The FFS mode LCD device of claim 10, further comprising a back electrode formed on the second substrate.

12. The FFS mode LCD device of claim 10, wherein the color filter is formed in a three-dimensional pattern structure having transmissive patterns of different sizes, the transmissive patterns for selectively transmitting light of red, green, and blue wavelengths.

13. The FFS mode LCD device of claim 10, wherein the metal layer is formed of one of aluminum, molybdenum, copper, gold, silver, and chrome.

14. The FFS mode LCD device of claim 10, wherein the transmissive pattern is formed of one of transparent polymer, Spin On Glass (SOG), organic material, and inorganic material.

15. The FFS mode LCD device of claim 10, wherein the transmissive pattern has one of a circular shape, a hole shape, an oval shape, a quadrangular shape, a triangular shape, and a slit shape.

16. The FFS mode LCD device of claim 10, further comprising, on the color filter, an insulating layer formed of a material of the first substrate.

17. The FFS mode LCD device of claim 10, wherein the pixel electrode has a plurality of slits in the pixel region.

18. The FFS mode LCD device of claim 10, wherein the metal layer of the color filter is formed in a single pattern on an entire pixel unit for displaying an image by a plurality of pixel regions.

* * * * *